(No Model.)
J. E. & E. M. MITCHELL.
PLOW.
No. 506,710. Patented Oct. 17, 1893.
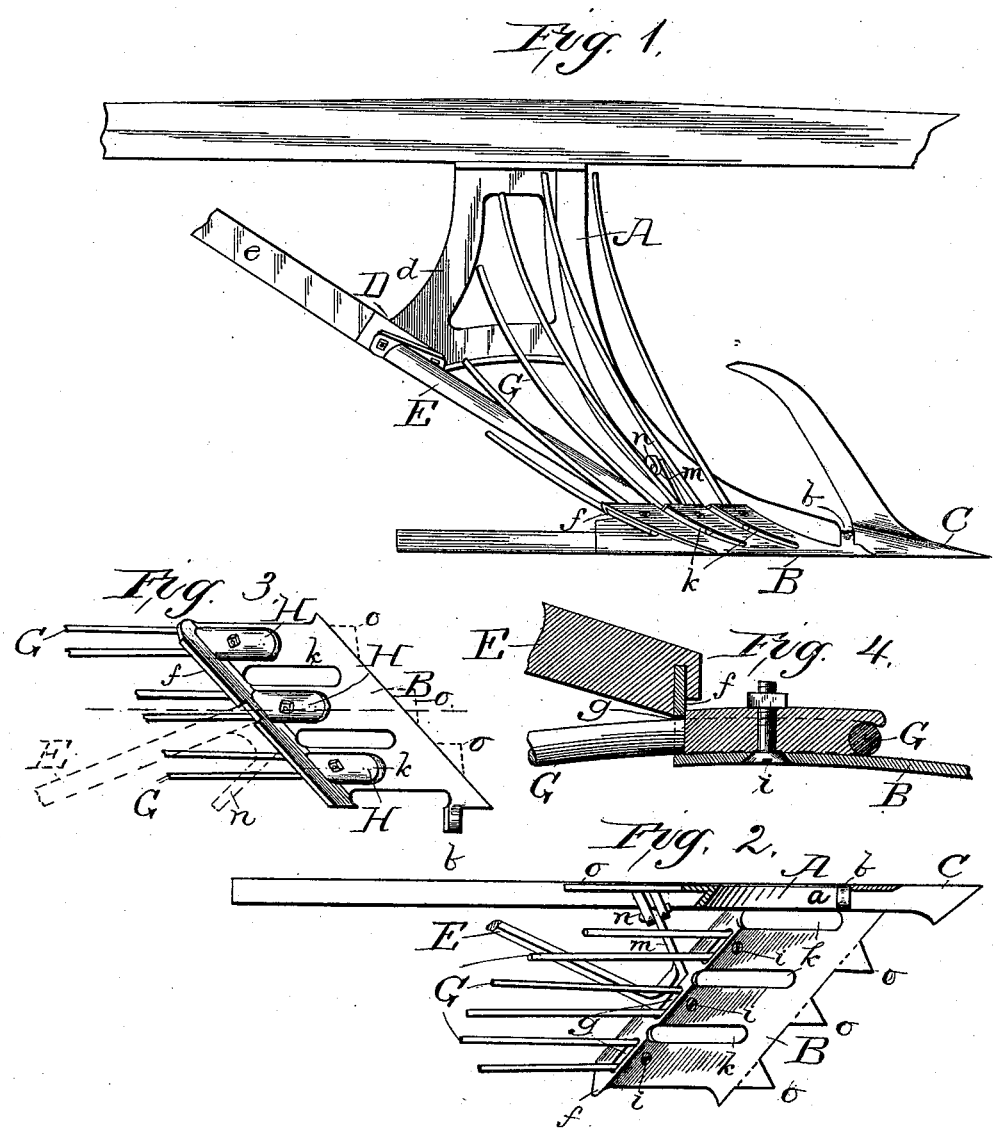
Witnesses: Wm. N. Rhemm; [signature]
Inventors: John E. Mitchell, Elma M. Mitchell, By Frank D. Thomason, Atty

UNITED STATES PATENT OFFICE.

JOHN E. MITCHELL AND ELMA M. MITCHELL, OF SALEM, IOWA.

PLOW.

SPECIFICATION forming part of Letters Patent No. 506,710, dated October 17, 1893.

Application filed August 28, 1891. Serial No. 404,003. (No model.)

*To all whom it may concern:*

Be it known that we, JOHN ENSIGN MITCHELL and ELMA MARIA MITCHELL, both of Salem, Henry county, Iowa, have invented certain new and useful Improvements in Plows, of which the following is a full, clear, and exact description, reference being had to the accompanying drawings, and to the letters of reference marked thereon.

The object of our invention is to provide a skeleton plow-share, which has an unbroken edge, and has its mold board constructed of bars extending rearwardly from the said share and so disposed of as to conform to the shape of a mold-board, and which is simple and cheap; substantially as hereinafter fully described, and as illustrated in the drawings, in which—

Figure 1, is a side elevation of our invention, with the forward part of the beam, and the rear portion of the handle bars broken away. Fig. 2, is a plan view of the same. Fig. 3 is a plan view from underneath. Fig. 4 is a longitudinal vertical section through the share plate.

In the drawings A represents the standard of our plow, the lower part of which curves forward and terminates in a suitable toe $a$. This toe is, preferably cylindrical, and extends forward beyond the forward end of the standard proper for the eye or collar $b$ of the share-plate B to be slipped over and secured thereon, and for the plow-point C to be subsequently slipped over it and secured thereon. The standard A has cast integrant therewith and extending to the rear from its upper end a diamond shaped frame $d$, which by being bolted or otherwise secured to the beam serves, at one and the same time, as a brace to the standard, and as a means of connecting the lower ends of the handle bars $e$ to the standard. For the purpose of securing the handle-bars the lower rear corner of frame $d$ is provided with a lug D to which said handle-bars are secured as shown. This lug also has secured to it the upper end of a brace E, which assists in maintaining the position of the plowshare as will be presently explained.

The plow-share of our invention, or that part of the plow which cuts and raises the soil consists of a plate B which, preferably, has an unbroken cutting edge, and extends backward about six to eight inches. The collar $b$ of this share-plate is secured to the toe $a$ of the standard, as before alluded to, and the said plate extends obliquely to the rear therefrom, so as to present the oblique cutting edge, and has projecting from the rear thereof the mold-bars G. In order to secure the mold bars in place we bend the rear edge $f$ of this plate downward, about at right angles to its upper surface, and make therein suitable openings $g$, for said mold bars thereon so that their forward ends will come under said plate and can be secured to the same by bolts or otherwise.

For economy and convenience of manufacture we prefer to make the bars G by bending double a single length of bar metal and inserting the bent end of the same through the openings $g$ in the rear edge of plate F which are elongated laterally to permit of this being done. In order to secure the forward ends of bars G whether made of a single length or by doubling a suitable length of bar, and in order to cover the same in such manner that they will not form obstructions to catch and accumulate débris under the share plate, we have provided the shoe plates H. The under surface of these shoe-plates is rounded and their forward ends are likewise made round so as to shed any loose soil which otherwise might have a tendency to be caught and held by the said shoe, or the unprotected forward ends of said bars. This shoe plate is secured to the under surface of the share plate, adjacent to the edge $f$ thereof, by means of sunken screws, or rivets, and its upper surface is suitably recessed so as to afford a seat for the forward end of the bar. If the bars are made by doubling a suitable length of bar metal, then the bolt $i$ will pass up through said plate within the bend of said bars, but if a single length of bar is used it is preferred to pass said bolt through the same. The share-plate cuts the soil and raises it slightly, and then the mold-bars turn the same. In order to give lightness to the share-plate and at the same time afford an escape for any possible accumulation of soil which may get in front of the downwardly turned edge $f$ of and under said share-plate, we have provided longitudinal slots $k$ in the share-plate which extend from within about three inches of the forward cutting edges of said plate to the rear edge $f$ thereof. These slots $k$ are so located as to come between the forward ends of bars G, and are of such width that the accumulations under the share-plate are forced by continued accretions up through the same over the rear edge of plate B and are turned with the earth by the said mold-bars.

We secure the plate B in position, by the brace E, before alluded to, in addition to the eye thereof surrounding the toe $a$ of the standard. This brace may consist of a straight rod connecting the rear edge of the share-plate B to the lug D of frame $d$ and bolted or otherwise secured to these parts. We prefer, however, that the brace should be sort of V-shaped: the longer arm connected to said lug D and the shorter arm $m$ having its extremity connected and secured to the lugs $n$ projecting from the heel $o$ of the standard.

When using the V-shaped brace it is not necessary that the angle thereof should be permanently secured to the rear edge of the share-plate. We, therefore, recess the lower down-turned edge $f$, and transversely recess the upper surface of the angle or bend of said V-brace, and thus form a sort of mortise joint which supports the rear edge of said share.

In Fig. 2, we show the cutting edge of the share B provided with projecting points $o, o, o$, the object of which is to render the plow useful for those soils which are best manipulated by several independent points rather than one continuous cutting edge. There may be one or more of these points $o$ on the share as desired, or they may be dispensed with altogether. In making them, however, we prefer to cast them integral with the share B.

What we claim as new is—

1. In a plow the combination with a standard, of a plow share, having its rear edge turned downwardly, and having a series of openings therein, mold-bars which have their forward ends passed through said openings and shoe plates for securing said bars to said share.

2. In a plow the combination with a standard, of a plow share, and removable mold bars secured at their forward ends to, and extending to the rear from said share, and arranged to conform to the shape of a mold board, said share having longitudinal slots therein, as set forth.

JOHN E. MITCHELL.
ELMA M. MITCHELL.

Witnesses:
FRANK D. THOMASON,
MARY SIMMS.